June 26, 1934.  H. P. CHANDLER  1,964,427

EXPANSION BOLT

Filed Sept. 29, 1933

Inventor
HOMER P. CHANDLER

By

Attorney

Patented June 26, 1934

1,964,427

UNITED STATES PATENT OFFICE 1,964,427

EXPANSION BOLT

Homer P. Chandler, Mansfield, Ohio, assignor to The Ohio Brass Company, Mansfield, Ohio, a corporation of New Jersey Application September 29, 1933, Serial No. 691,489

6 Claims. (Cl. 85—2.4)

My invention relates to supports and particularly to supports of the expansion type for supporting or holding articles with respect to walls, roofs, etc., and is particularly adapted for supporting trolley wire hangers and other devices from the roofs and walls in mines.

The object of my invention is to provide a simple inexpensive expansion bolt which can be depended upon to secure an article in position and possessing reliability and which can be easily removed from its installed position and re-used.

My invention resides in the new and novel construction, combination and relation of the various parts hereinafter described and shown in the accompanying drawing.

In the drawing:—

Figure 1:
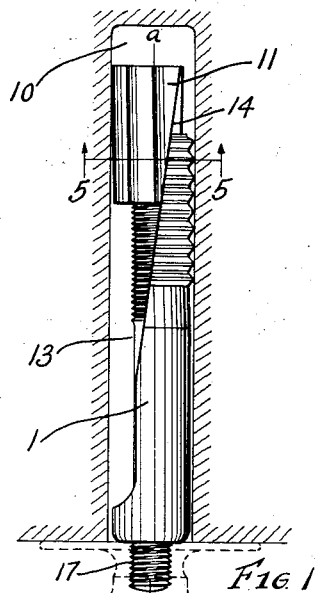
Fig. 1 shows a side view in elevation of my invention and represents the same as positioned in an opening in a mine roof or wall and as supporting a trolley wire hanger as shown in dotted lines.
Figure 2:
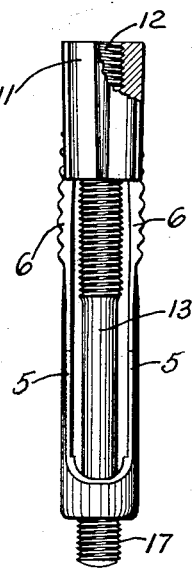
Fig. 2 is a side view in elevation in partial section taken at a 90° angle from that shown in Fig. 1.

Expansion bolts are extensively used for supporting or securing articles with relation to walls, roofs, etc., and are particularly adapted for use in mines for supporting trolley wire hangers and other fixtures to the walls and roof thereof.

The use at any one point in mines is very often of a temporary nature and it is desirable to have an expansion bolt which will not only reliably secure the supported article in place but which can be readily removed if so desired.

In the preferred embodiment of my invention I employ a body member 1 which may be said to comprise an elongated tubular member with the side cut away for a considerable portion of its length. The body member is provided with an opening 2 at one end which is completely surrounded by the wall 3, having inwardly projecting bead or flange 4 which determines the size of the opening 2. The body 1 is open along one side and has exposed edges 5 and 6, the latter being obliquely disposed to provide wedging means on the body.

The opening 2 may be said to extend throughout the length of the body member 1 and provide the U-shape opening 7 above the wall 3. At the opposite end of the body 1 from the opening 2 and extending back from the extreme end for a considerable distance are transversely formed ridges 8 and grooves 9 which will embed themselves into the side walls of the opening 10 in which the bolt is installed and will thus hold the body member 1 against relative movement with respect to the walls of the opening 10.

The wedging member 11 is of an elongated shape having an axial opening 12 therethru, the wall of which is threaded to receive a threaded stud 13.

The wedging member is provided with obliquely disposed faces 14 which engage with and cooperate with the obliquely disposed edges 6 to enlarge the one end of the expansion bolt when the wedge and body are moved relative to each other in one direction through the medium of the stud 13. The amount of expansion or enlargement of the bolt due to the cooperating edges 6 and 14 depends upon the angularity of the edges 6 and 14 and the amount of relative movement of the members 1 and 11. Other means for expanding the bolt in addition to that just described will be set forth later. The wedging member 11 is provided with vertically disposed ribs 15 and the recesses 16 which will embed themselves into the walls of the opening 10 and prevent rotation of the wedging member 11 relative to the said walls but will not prevent axial movement of the wedging member when moved through the rotation of the stud 13.

The installation of the expansion bolt together with the article supported is quite simple. The opening 10 is made, as for instance in the roof of a mine, of the proper size and the expansion bolt is then placed in position in the opening with the wedging member 11 moved well to the end of its extreme position.

The article to be supported, as for instance a trolley wire hanger H shown in dotted lines, is secured to the lower end of the stud 13 by means of threads 17. It will be noted that after the hanger H has been secured in position upon the threads 17 through rotation that continued rotation of the hanger will rotate the stud 13 and as the stud 13 rotates the wedging member 11 will be drawn downward and the cooperating obliquely disposed surfaces 6 and 14 will cause an expansion of the upper end of the expansion bolt. This expansion will be the result of the relative movement of the members 1 and 11 and the angularity of the faces 6 and 14 as previously described and will constitute the only means of expanding the bolt so long as the axis AA remains parallel with that of the body 1.

As the wedging member 11 moves downwardly it also moves laterally and the stud 13 will move laterally also with the wedge 11 until the stud 13 engages with the flange 4. When this engagement takes place further downward movement of the wedge 11 will cause the wedge and stud 13 to pivot about the point of engagement of the stud with the flange 4 and will tend to throw the upper edge of the wedge member 11 away from the member 1. The wedge 11 will also pivot about the point of engagement of the lower edge of the surfaces 14 with the surfaces 6. Thus the expansion of the bolt may be said to be due not only to the plain wedging action of the members 1 and 11 sliding on their obliquely disposed surfaces but also to the pivotal action of the wedge relative to the body 1 after the stud 13 engages with the flange 4.

Figure 3:
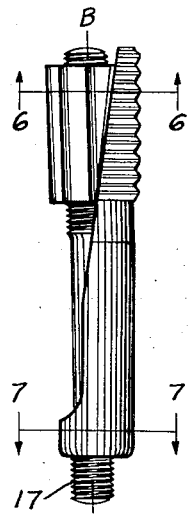
Fig. 3 shows the same side view in elevation as in Fig. 1 but with the wedging members moved to expand the bolt.
Figure 5:
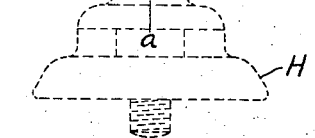
Fig. 5 is a transverse sectional view on the line 5—5 of Fig. 1.
Figure 5:
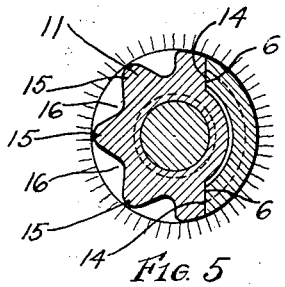
Figure 6:
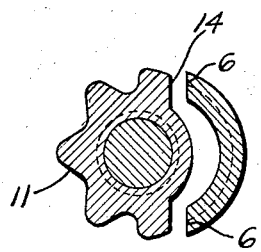
Fig. 6 is a transverse sectional view on the line 6—6 of Fig. 3.
Figure 4:
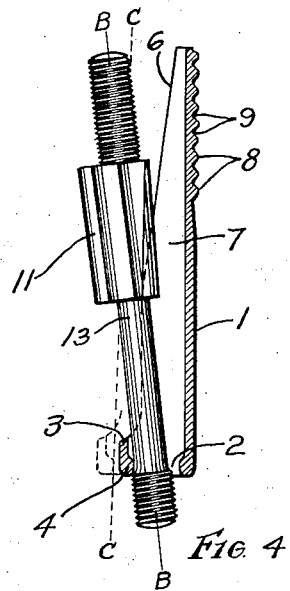
Fig. 4 is the same side view as in Fig. 3 in partial section, however, and showing the wedging members moved to a greater expanding position than in Fig. 3.
Figure 7:
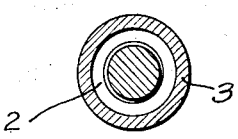
Fig. 7 is a sectional view on the line 7—7 of Fig. 3.
Figure 8:
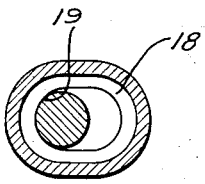
Fig. 8 is a sectional view corresponding to Fig. 7 of a modification later described.

This will throw the axis AA out of normal as shown by the axis BB in Figs. 3 and 4, and it might be contended that this will be a disadvantage and throw the axis of the hanger H out of normal, but in practice the diameter of the opening 10 is usually made close to the diameter of the expansion bolt in the position shown in Fig. 1 and the movement of the wedge 11 relative to the body 1 is usually not so great as to throw the axis of the hanger H out of normal to a detrimental degree.

The extreme condition of expansion due to the plain wedging movement and the pivotal movement is shown in Fig. 4 and it will be noted that the axis BB is greatly inclined with respect to the normal.

Where it is desired to avoid the pivotal movement but to utilize the extreme simple expansion of the bolt due to the relative movements of the members 1 and 11 and the obliquely disposed faces 6 and 14, the lower end of the member 1 may be constructed with an oval opening 18 which has a short diameter the same as the opening 2 but a long diameter sufficient to permit a lateral movement of the stud 13 set up by the lateral movement of the wedging member 11 before the stud 13 engages the flange 19. This is further shown in Fig. 4 by moving the wall 3, as shown by dotted lines to represent its position with an oval opening in which case the extreme contacting side of the stud 13 is represented by the dotted line CC.

It will be noted that two means of expanding the bolt have been shown and described, namely, a purely wedging action and a pivotal action, and the expansion of the bolt may be confined purely to the wedging action or to a combination of wedging and pivotal action by proper size of the opening 2 formed by the flange 4 with respect to the stud 13.

In order to remove the bolt from its installed position, it is only necessary to remove the hanger H and to then drive the stud 13 upwardly thus reducing the expanded size of the bolt and permitting withdrawal of the body member 1. If the wedge member is driven sufficiently such that the lower end of the stud 13 passes beyond the flange 4, then a hook-shaped tool may be inserted through the opening 2 and engage with the flange 4 for withdrawing the body 1 but this, as a rule, is not necessary.

The position of the flange 4 may be changed from that shown or it may be omitted. Where considerable expansion of the bolt is required there is usually sufficient movement of the bolt and hanger relative to each other and to the mine roof to permit adjustment of the parts so that the axis of the hanger will be sufficiently normal.

Modifications of my invention will suggest themselves to those skilled in the art, therefore, I wish to be limited only by my claims.

I claim:—

1. An expansion bolt comprising a body member and a wedge member each having surfaces to engage and grip the walls of an opening in which the bolt is mounted, a boss on the wedging member and a stud mounted in the boss to move the members relative to each other to expand the bolt and attaching means at one end of the stud, the members having cooperating obliquely disposed surfaces to cause the expansion of the bolt when the members are moved relatively by the stud and other means to increase the expansion of the bolt to that set forth above comprising an abutment producing engagement of the stud with the body member to cause the wedging member to pivot relative to the body member about the lower edge of the oblique surface on the wedging member in contact with the oblique surface on the body member.

2. An expansion bolt comprising a body member and a wedging member each having surfaces to engage and grip the walls of an opening in which the bolt is mounted, elongated means projecting from the wedging member and having attaching means at one end, the members having cooperating obliquely disposed surfaces to effect the expansion of the bolt when the members are moved relatively by the elongated projecting means and other means to increase the expansion of the bolt to that set forth above comprising an abutment producing engagement of the elongated means with the body member at a point remote from the wedge member to pivot the wedging member relative to the body member.

3. An expansion bolt comprising a body member and a wedge member each having surfaces to engage and grip the walls of an opening in which the bolt is mounted, a boss on the wedging member and a stud mounted in the boss to move the members relative to each other to expand the bolt and attaching means at one end of the stud, the members having cooperating obliquely disposed surfaces to cause the expansion of the bolt when the members are moved relatively by the stud and other means to increase the expansion of the bolt to that set forth above comprising means on the body member to engage the stud at a point remote from the wedging member to pivot the wedging member relative to the body member.

4. An expansion bolt comprising a body member and a wedging member each having surfaces to engage and grip the walls of an opening in which the bolt is mounted, projecting means associated with the wedging member and having attaching means at one end, the members movable longitudinally of each other to expand the bolt in the opening and means on the body member to engage the projecting means associated with the wedging member to pivot the wedging member relative to the body member as the member moves relative to each other to further expand the bolt.

5. An expansion bolt comprising a body member and a wedging member associated together and slidable relative to each other each member having surfaces to engage and grip the walls of an opening in which the bolt is mounted, cooperating surfaces on the members arranged to slide upon each other, elongated means associated with the wedging member, means on the body member to engage the elongated means to pivot the members relatively to each other as the members slide relatively to each other to expand the bolt to grip the wall of the opening and attaching means on one end of the elongated means.

6. An expansion bolt comprising a body member and a wedging member each having surfaces to engage and grip the walls of an opening in which the bolt is mounted, the body member having circumferential projecting means on its engaging surface to prevent longitudinal movement of the body member and the wedging member having longitudinally disposed projecting means on its engaging surface to prevent rotation of the bolt, projecting means associated with the wedging member and having attaching means at one end, the members movable longitudinally of each other to expand the bolt in the opening and means on the body member to engage the projecting means associated with the wedging member to pivot the wedging member relative to the body member as the member moves relative to each other to further expand the bolt.

HOMER P. CHANDLER.